United States Patent
Kobayashi et al.

[11] Patent Number: 5,736,979
[45] Date of Patent: Apr. 7, 1998

[54] COORDINATE INPUT APPARATUS

[75] Inventors: Katsuyuki Kobayashi, Yokohama; Atsushi Tanaka, Kawasaki; Yuichiro Yoshimura, Kamakura; Kiyoshi Kaneko; Masaki Tokioka, both of Yokohama, all of Japan

[73] Assignee: Canon Kabushiki Kaisha, Tokyo, Japan

[21] Appl. No.: 355,437

[22] Filed: Dec. 13, 1994

Related U.S. Application Data

[63] Continuation of Ser. No. 923,481, Aug. 3, 1992, abandoned.

[30] Foreign Application Priority Data

Aug. 5, 1991 [JP] Japan .................. 3-195181

[51] Int. Cl.$^6$ .................................. G09G 5/00
[52] U.S. Cl. .................. 345/177; 345/179; 178/18; 178/19
[58] Field of Search ............... 345/173–179; 178/18, 19

[56] References Cited

U.S. PATENT DOCUMENTS

| | | | |
|---|---|---|---|
| 4,886,943 | 12/1989 | Suzuki et al. | 178/18 |
| 4,910,363 | 3/1990 | Kobayashi et al. | 178/18 |
| 4,931,965 | 6/1990 | Kaneko et al. | 364/560 |
| 5,017,913 | 5/1991 | Kaneko et al. | 340/712 |
| 5,070,325 | 12/1991 | Tanaka et al. | 340/706 |

FOREIGN PATENT DOCUMENTS

| | | |
|---|---|---|
| 0207527 | 7/1987 | European Pat. Off. |
| 0333219 | 9/1989 | European Pat. Off. |

*Primary Examiner*—Richard Hjerpe
*Assistant Examiner*—Amare Mengistu
*Attorney, Agent, or Firm*—Fitzpatrick, Cella, Harper & Scinto

[57] ABSTRACT

Disclosed is a coordinate input apparatus including a vibrating input pen 3, a piezoelectric element 4 in the pen 3, a vibration transfer plate 8 and vibration sensors 6 provided around the vibration transfer plate 8. The vibrator 4 is driven by a vibrator driving circuit 2 to generate a vibration, which is transmitted to vibration transfer plate 8. The apparatus is capable of calculating coordinate thereon accurately with phase information of detected signal waveform.

8 Claims, 8 Drawing Sheets

TOOL FORCE  LARGE
DISTANCE   SHORT

TOOL FORCE  MIDDLE
DISTANCE   MIDDLE

TOOL FORCE  SMALL
DISTANCE   LONG

COORDINATE INPUT APPARATUS

This application is a continuation of application Ser. No. 07/923,481 filed Aug. 3, 1992, now abandoned.

BACKGROUND OF THE INVENTION

1. Field of the Invention

The present invention relates to a coordinate input apparatus and others for detecting indicated coordinates on the basis of the vibration transmission time obtainable from the vibrating source on a vibration transfer diaphragm, for example.

2. Related Background Art

As apparatuses for inputting the conventional handwritten characters, graphic and the like into a computer and other processing apparatuses, there have been known coordinate input apparatuses using various kinds of input pens, tables, and others. In such apparatus, the image information consisting of inputted characters, graphics, and the like is output for being displayed on a display device such as a CRT display or a recording device such as a printer. Of these coordinate input apparatuses, various systems such as given below are known as the coordinate detection methods for the tablet type coordinate input apparatus.

(1) A system comprising a resistive film and a sheet material correspondingly arranged therefor to detect coordinate value by change in the resistance value at compressed point.

(2) A system for detecting coordinate position in accordance with the electromagnetic or electrostatic induction of conductive sheet arranged facing each other.

(3) A system for detecting coordinate position of an input pen on the basis of ultrasonic vibration transmitted from the input pen to a tablet.

There are, however, the drawbacks given below in the conventional coordinate input apparatuses adopting these systems.

For the above-mentioned type using the resistive film (Case: (1)). The uniformity of the resistor itself affects the input accuracy of the graphics directly, thus necessitating resistors of an excellent uniformity. Therefore, the larger the apparatus becomes, the more difficult it is to produce the apparatus, and eventually, this system is not suited for any apparatus which requires high precisions. Also, two resistive sheets are needed for the x-coordinate and y-coordinate, which results in the lowered transparency of the coordinate input plane. As a result, when the apparatus is overlaid with a manuscript or the like for use, there is a drawback that it is not easy to see the manuscript.

Next, for the type which utilizes the electromagnetic induction (Case: (2)), wirings are arranged in matrix. The coordinate detection accuracy is directly affected by the positions of the wirings arranged in matrix, namely, the manufacturing precision. Thus, for a highly precise input apparatus, the manufacturing cost becomes extremely high.

As compared with these systems, the type using ultrasonic wave is such that the positioned coordinates are worked out by detecting the delay time of the wave being propagated on the tablet which serves as the input plane, and no fabrication of matrix wirings and others are needed at all on the tablet. It is therefore possible to provide an apparatus at a low manufacturing cost. Moreover, if a transparent glass plate is employed for the tablet, it is possible to construct a coordinate input apparatus having a higher transparency than the input plates using the other systems.

However, in the conventional ultrasonic coordinate input apparatus, the waveform of the detected signal of an output wave from its sensor are not only caused to vary its amplitude level by the attenuation of the wave due to the distances between the vibrating input pen and the sensor, but also are largely dependent on the degrees of the tool forces of the input pen exerted by an operator. Consequently, when the delay time is detected with the detected signal waveform exceeding a given level as a specific point (whose level over a given level is required in order to distinguish it from noise), the leading portion of the waveform of the detecting signal is not detected, and the second cycle and third cycle (refer to FIGS. 7A to 7C) are output depending on the levels of the detected signal waveforms, thus creating a drawback that the coordinates are erroneously detected. In order to solve this problem, it is electrically possible to adopt a method of making the levels of the detected signal waveforms constant, but this creates another problem that the cost will be significantly increased due to an increased number of circuit parts. Besides, the reference signal data are needed for the determination of amplification factor. As a result, not all the inputted data can be used for the coordinate calculation. In other words, a problem is encountered in lowering the sampling rate for working out the coordinates.

In order to detect the delay time while taking these problems into account, it is necessary to adopt a method that can be practiced without depending on the amplitude levels of the detected signal waveforms. For solving these problems, it is conceivable to adopt a method for measuring the delay time in such a manner that the envelope of the detected signal waveforms is electrically derived and processed by differentiation or the like to make the envelope peak or the inflexion point of the envelope as the specific point for detection. But there arises a problem for this method that analogue circuits must be additionally provided for producing the envelope as well as for obtaining the peak value thereof, leading to another cost up. Also, a disadvantage such as an increased power consumption will result. As a more significant problem, since the point on the temporal axis lagged behind the leading portion (of the detected signal waveform) of the wave being propagated on the vibration transmission plate is made as the detection point, the wave which has advanced before the detection point is reflected at the end of the vibration transfer diaphragm and is allowed to be superposed with the detected signal waveforms by the direct wave, and accordingly, there is a possibility that the detected signal waveform for measuring the delay time is distorted. This causes the accuracy of the coordinate detection of the coordinate input apparatus to be significantly lowered. In order to solve this problem, either the reflection at the end should be eliminated, or the distance to the end should be made longer so that the time for the reflected wave to return is delayed to avoid its superposition with the detection point in the detected signal waveform. It is possible to reduce the level of the reflected wave in the former method of the solution by the use of a vibration-proof material and the like, but it is technically difficult to eliminate the reflected wave completely. Also, for the latter method of the solution, a certain length of distance is needed to the end, which necessitates making the size of the vibration transfer diaphragm greater for the effective area required to input the coordinates, thus resulting in a drawback that the apparatus becomes large as a whole.

Also, in a coordinate input apparatus utilizing the ultrasonic waves, it is well known that if the wavelength of elastic wave propagating on a vibration transfer diaphragm becomes greater than the diaphragm thickness, a Lamb wave is often propagated with difference in its group velocity and phase velocity. FIG. 8 is a schematic view showing a relationship between the distances and the delay times in wave arrival when this wave is used with the detection points of the phase delay time being set above a predetermined level and also with the peak of the envelope given as each of the detection points of the group delay time. Although the group delay time is continuous, it has a relationship showing greater fluctuations of the widths, and the phase delay time has a stepwise relationship. Such relationships are caused by the nature of the a Lamb wave which has different phase velocity and group velocity. In this case, it is impossible to perform a measurement with any desirable accuracy by distance calculation using only the group delay time. When a distance is calculated with the phase delay time, the relationship between the phase delay time and the distance still remains in the stepwise form as shown in FIG. 8 even if the levels of the detecting signal waveforms are made constant electrically to remove the sonic wave attenuation and the effect of the tool force dependence. In other words, there is a drawback that if, for example, a value $t_0$ is output in FIG. 8, it is impossible to determine whether the distance is $1_1$ or $1_2$.

In order to solve this problem, there has been proposed a method of calculating coordinates by detecting both the group delay time and phase delay time of a diaphragm wave as disclosed in the U.S. Pat. No. 4,931,965 which is a prior application. In this method, given a distance between a sensor and a vibration input source as L, distance to each sensor is calculated as follows:

$$L = Vp \cdot Tp + n \cdot \lambda p \quad \ldots (1)$$

$$n = int[(Vg \cdot Tg - Vp \cdot Tp)/\lambda p] \quad \ldots (2)$$

where

Vp: phase velocity of Lamb wave

Tp: phase delay time

Vg: group velocity of Lamb wave

Tg: group delay time $\lambda p$: wavelength of Lamb wave

On the basis of this information, the coordinates are worked out geometrically. This method is an excellent method because with it not only the aforesaid problem can be solved, but also the coordinates can be calculated without depending on the levels of the detecting signal waveforms. However, this method still has a drawback that its circuits become complicated since both the group delay time and phase delay time should be detected, accordingly, its power consumption is increased. Also, as it is necessary to detect the group delay time, the apparatus should unavoidably become greater as a whole in relation to its effective area.

SUMMARY OF THE INVENTION

The present invention has been made in consideration of the above-mentioned prior example. It is an object of the invention to provide an coordinate input apparatus capable of calculating coordinate accurately only with the phase information of the detecting signal waveforms without affect of the level fluctuations of the detecting signal waveforms, further the apparatus being structured compactly by saving circuits, leading to a low power consumption as well as a low cost of its fabrication.

It is another object of the present invention to provide an ultrasonic coordinate input apparatus capable of calculating coordinates with a high precision without affect of the attenuation of elastic wave dependent on the distance between a vibration input source and each vibration sensor, the tool force of a vibration pen, and the like.

It is still another object of the present invention to provide an ultrasonic coordinate input apparatus capable of significantly reducing the size of its vibration transfer diaphragm in relation to the effective area where the coordinate input is possible without any noticeable effect of reflection waves from end portion of the vibration transfer diaphragm.

DETAILED DESCRIPTION OF THE PREFERRED EMBODIMENTS

Hereinafter, in accordance with embodiments shown in the accompanying drawings, the present invention will be described in detail.

Figure 1:
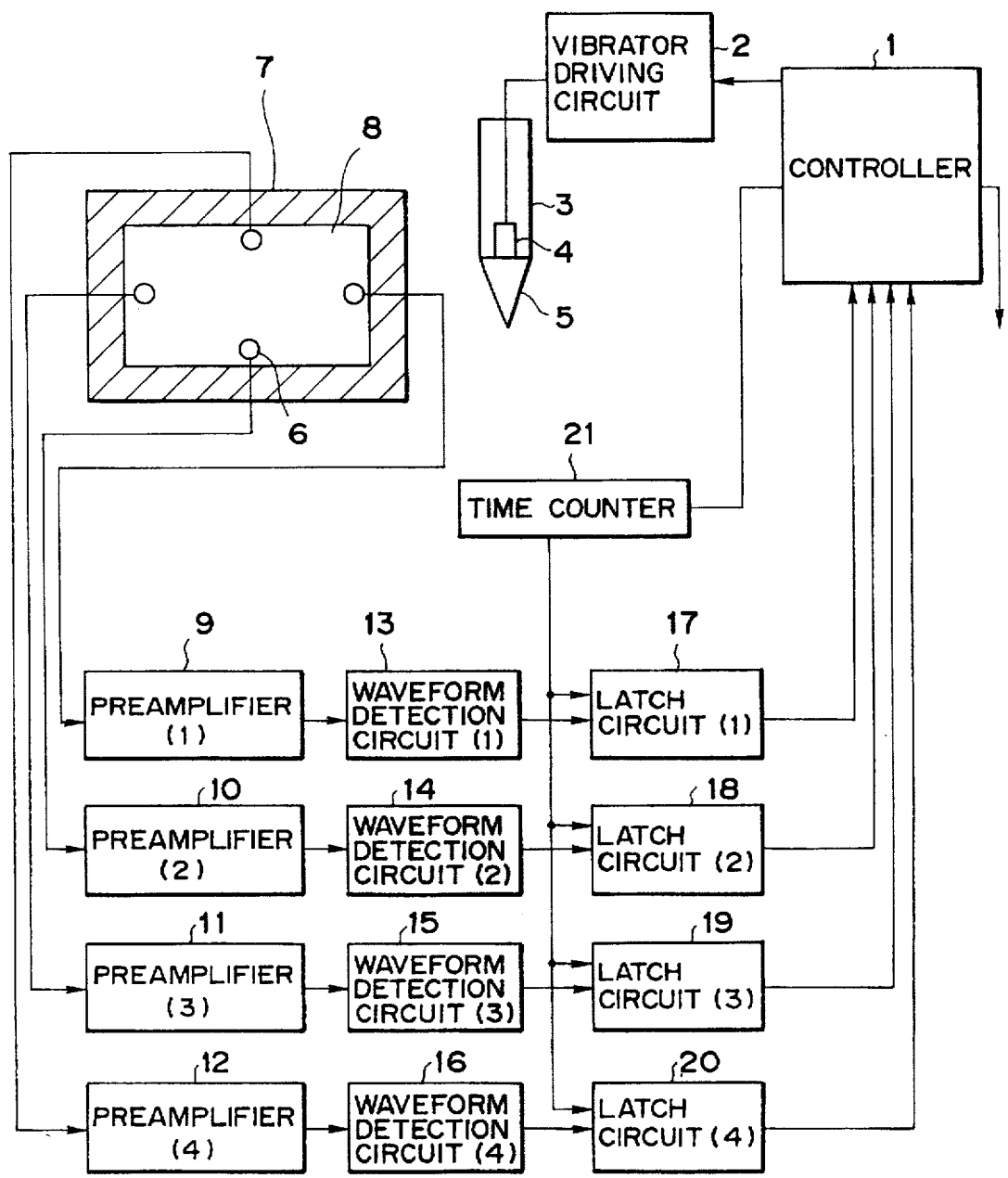
FIG. 1 is a block circuitry diagram showing the entire structure of a coordinate input apparatus according to the present invention.

FIG. 1 is a structural view showing a coordinate input apparatus embodying the present invention, in which a reference numeral 8 designates a vibration transfer plate and 6, a vibration sensor comprising the piezoelectric element for detecting elastic waves. In the present embodiment, four vibration sensors 6 are provided each on every side of the circumference of the vibration transfer plate 8. A reference numeral 7 designates a vibration-proof member for removing reverberation of the elastic waves on the vibration transfer plate 8. A reference numeral 3 designates a vibrating input pen, and a piezoelectric element 4 in the vibrating input pen 3 is driven by a vibrator driving circuit 2. The vibrator driving circuit 2 generates pulse trains of specific frequency for a certain periodic cycle to drive a vibrator 4 in the vibrating input pen 3. The vibrational energy thus generated enters the vibration transfer plate 8 through a horn portion 5. The waves propagating on the vibration transfer plate 8 are detected by the vibration sensor 6 and are amplified by preamplifier circuits 9 to 12 and then inputted into waveform detection circuits 13 to 16. The waveform detection circuits 13 to 16 detect an arrival timing of given waveform components by waveform processing of each detection signal, thus enabling latch circuits 17 to 20 to latch the timing information from a time counter 21 in accordance with this detection output. The timing information thus latched by the latch circuits 17 to 20, namely the arrival delay time information of the elastic wave from its input point to each vibratory sensor 6, is inputted into a controller 1 comprising a microcomputer and others. The controller 1 calculates the coordinates at the input point from said latched timing information in such a manner as described later and inputs the information into some other information processing apparatus for example, a personal computer.

Figure 2:
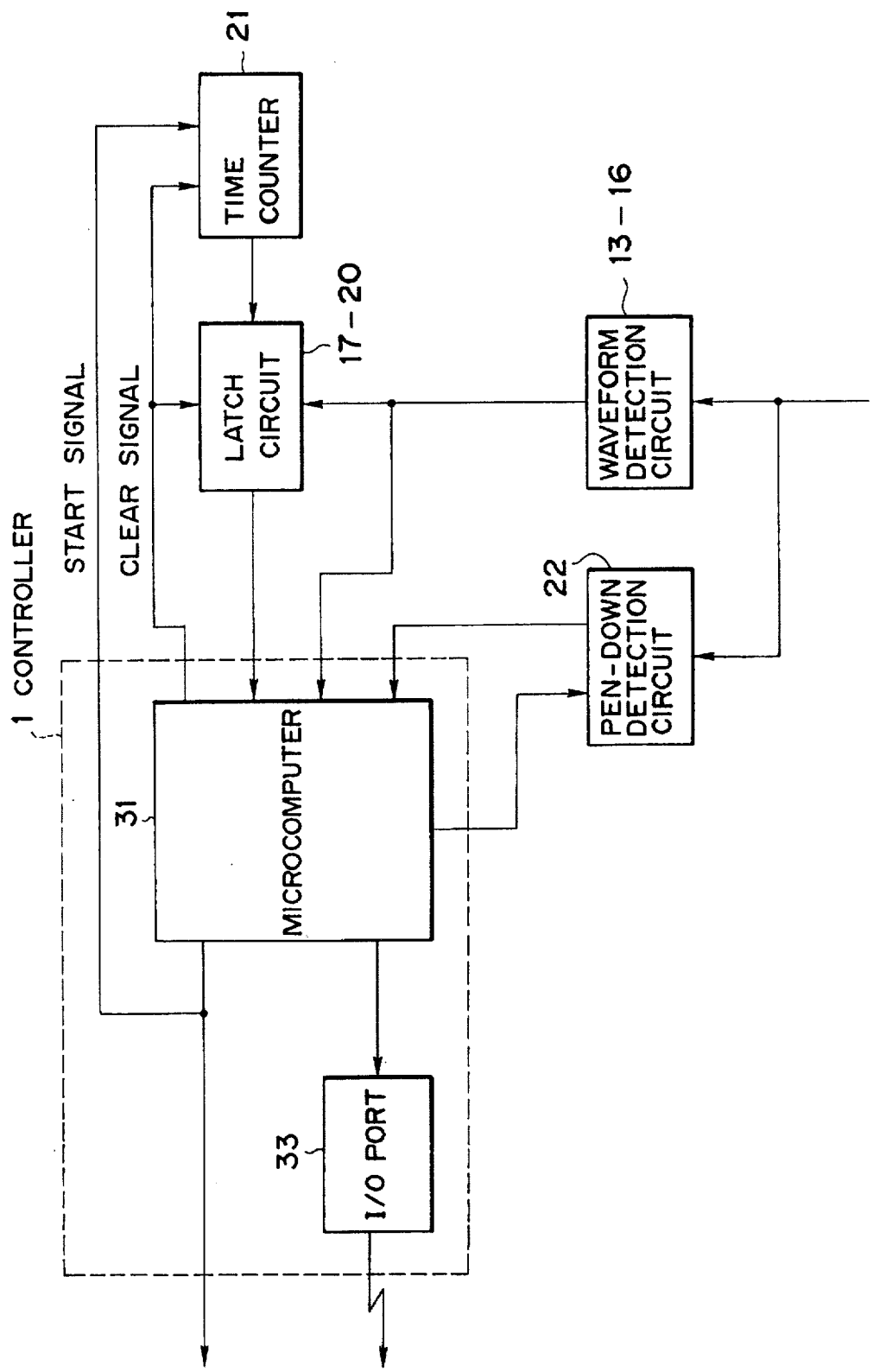
FIG. 2 is a block circuitry diagram showing the coordinate detection system of a coordinate input apparatus according to the present invention.

Now, in conjunction with FIG. 2, the description will be made of details of controls performed for each circuit by the controller 1. In FIG. 2, a reference numeral 31 designates a microcomputer for constituting the controller 1 and having ROM, RAM and internal counter. The microcomputer 31 resets the latch circuits 17 to 20 and time counter 21 by a clear signal at first.

A pen down detection circuit 22 detects a vibration waveform generated when the vibrating input pen 3 contacts with the vibration transfer plate 8, whereby the vibrating input pen 3 is put down on the vibration transfer plate 8. The pen down detection circuit 22 is reset by a clear signal for detecting a new pen down signal. The latch circuits 17 to 20 clear the contents latched. Also, the time counter 21 clears its counted value to be in the standby state for a starting signal to be inputted.

Then, the microcomputer 31 transmits the starting signal to the vibrator driving circuit 2 and the time counter 21 as well. With this starting signal, the vibrator driving circuit 2 generates pulse trains of a given frequency to drive the piezoelectric element 4. Also, the time counter 21 starts counting with clock of a frequency suited for required resolution. The distance from the vibrating input pen 3 to each vibration sensor 6 which should be obtained at first for calculating coordinates is derived on the basis of the product of the propagating velocity of an elastic wave and the arrival delay time of the elastic wave. Therefore, in order to enhance the resolution of the distance measurement, it is necessary either to slow down the propagating velocity of the elastic wave or to heighten the frequency of the aforesaid clock. However, when the frequency of the clock is heightened, the electronic parts should follow such a heightened velocity, leading to a higher cost apparatus. Therefore, in the present embodiment, using a comparatively slow Lamb wave having a frequency of approximately 300 KHz (the thickness of the vibration transfer diaphragm being 1.2 to 1.6), a coordinate input apparatus of high resultant resolution is implemented at a low cost.

Now, the elastic wave generated by the vibrations of the vibrating input pen 3 is converted into electrical signal by each vibration sensor 6 and inputted into the waveform detection circuits 13 to 16 through the preamplifier circuits 9 to 12. The latch circuits 17 to 20 take in the outputs of the time counter 21 with the output signals from each waveform detection circuit being used as trigger, and output the values to the microcomputer 31. The microcomputer 31 performs processing (described later) from these data to calculate coordinate values and then transfer them to a host information processing apparatus through an input/output port 33 (comprising RS-232C port and others, for example).

Continuously, in order to obtain the next coordinate values at the input point, which are being inputted in succession, said control is repeated starting with the clear operation of the latch circuits and time counter as well. In this case, if no detection signal is output even after the propagation delay time (maximum value) of the elastic wave elapses at the point where the distance between the vibrating input pen 3 and the vibration sensor 6 becomes maximum after the vibrating input pen 3 has been driven (that is, the starting signal has been output), the vibrating input pen 3 is in a state where it is apart from the vibration transfer plate 8, that is, the time the pen is up. Accordingly, the measurement of the propagation delay time is cut off and the control will be repeated starting with the aforesaid clear operations.

With the control and processing set forth above, it is possible to detect the indication point coordinates on real time.

Figure 3:
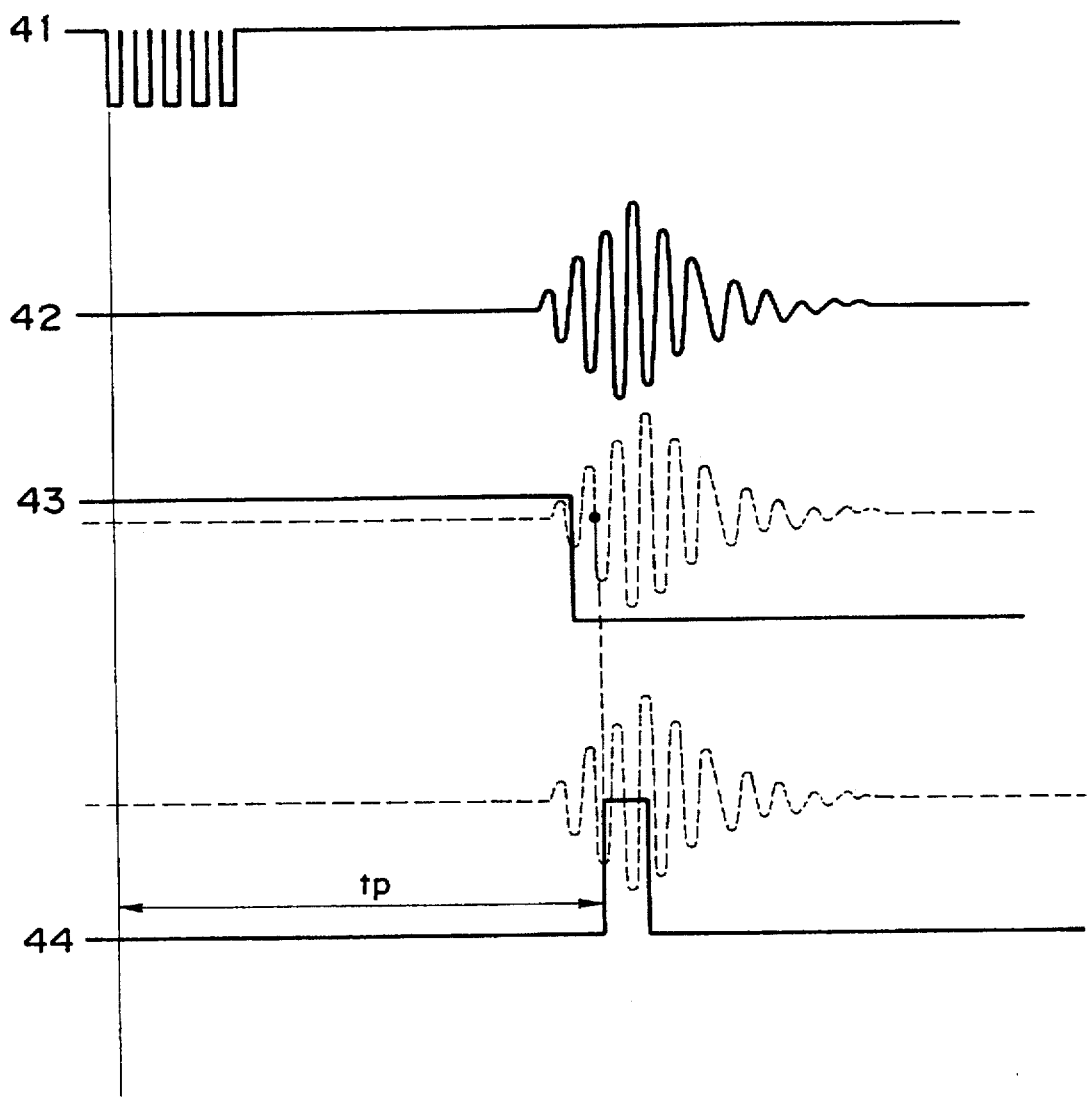
FIG. 3 is a time chart for signal processes according to the present invention.

FIG. 3 is a view showing the signal waveforms from the vibration sensors 6 inputted into the waveform detection circuits 13 to 16 and the measuring processing of vibrational propagation delay time on the basis thereof. In FIG. 3, the waveform shown at 41 shows the pulses of the driving signal applied to the piezoelectric element 4 in the vibrating input pen 3. In the present embodiment, it is driven by a pulse train of (equivalent to five cycles) of 300 KHz. The ultrasonic wave vibration driven by such driving signal and inputted into the vibration transfer diaphragm 8 from the vibrating input pen 3 is detected by the vibration sensor 6 after the elapse of a time corresponding to the straight-line distance to the vibration sensor 6, and then output electrically. A reference numeral 42 shows the detection signal waveform output by the vibration sensor 6. A reference numeral 43 indicates a state where the window is opened with the location where the level of the detection signal waveform becomes higher than a given value as the reference; and 44, the signal for measuring a delay time tp which makes the zero cross its detection point, at which the phase information of the detection signal waveform rises initially from the state where the window at 43 having been opened.

Figure 7A:
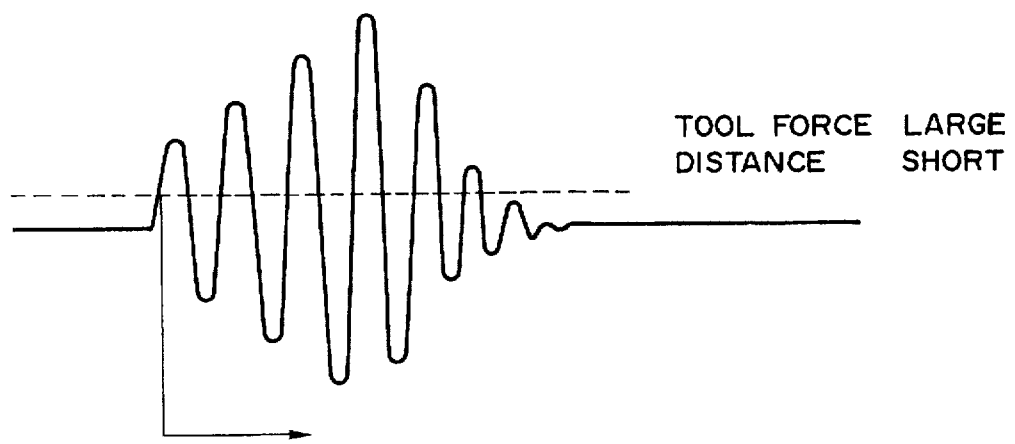
FIGS. 7A to 7C are views for explaining the dependence of detection delay times on the levels of signal waveforms.
Figure 7B:
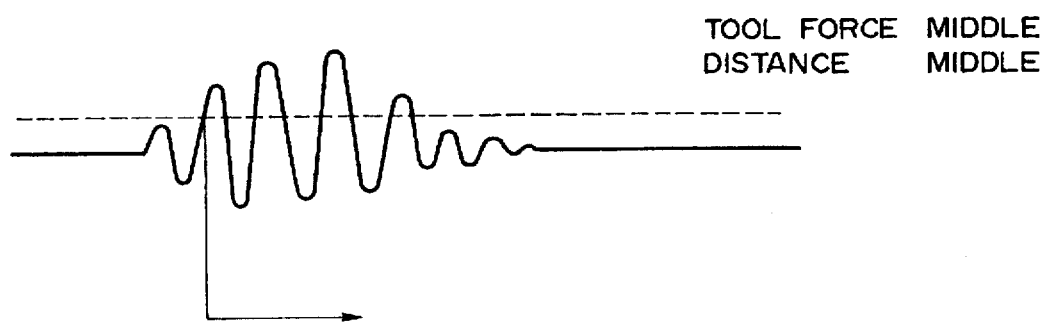
Figure 7C:
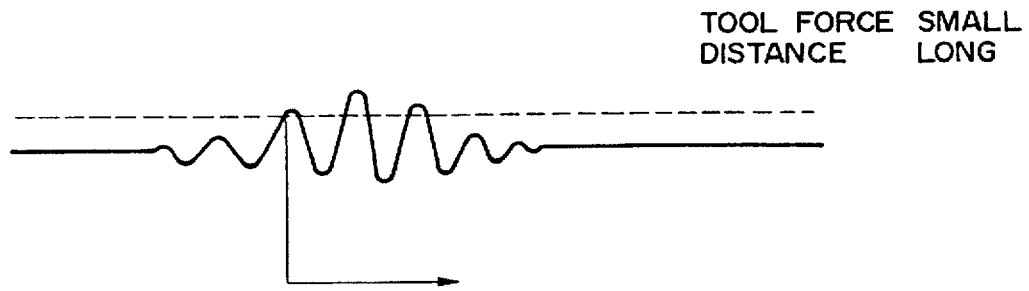

According to this structure, the propagation delay times obtainable from the amplitude levels of the output detection signal waveforms become different even if the distances between the vibrating input pen 3 and the vibration sensors 6 are the same. This occurs because the window for detecting the delay time tp is opened (FIG. 7) using a threshold value, and as the difference in the detected propagation delay times is equivalent to a value integral times a cycle τ of the elastic wave, a delay time required is given by following equation (3):

$$T = tp + n \cdot \tau \qquad \ldots (3)$$

where tp: propagation delay time output by the present detection system n: integer One of the tentative delay times T given by this value n can be a genuine delay time. Therefore, by obtaining the value n, the distance L between a certain vibration sensor 6 and the vibrating input pen 3 can be obtained by following equation provided that the frequency of the Lamb wave is f:

$$L = Vp \cdot tp + n \cdot \lambda p \qquad \ldots (4)$$

where

Vp: phase velocity of Lamb wave

λp: wavelength of Lamb wave (=Vp/f=Vp·τ)

Therefore, it is possible to calculate the distance L accurately if the integer n can be obtained. Hereinafter, the method of this calculation will be described. The integer n is determined by the amplitude of vibration detected by each sensor and the threshold value, and the distance between the vibrating input pen 3 and the vibration sensor 6. Accordingly, if differs by each sensor.

Figure 4:
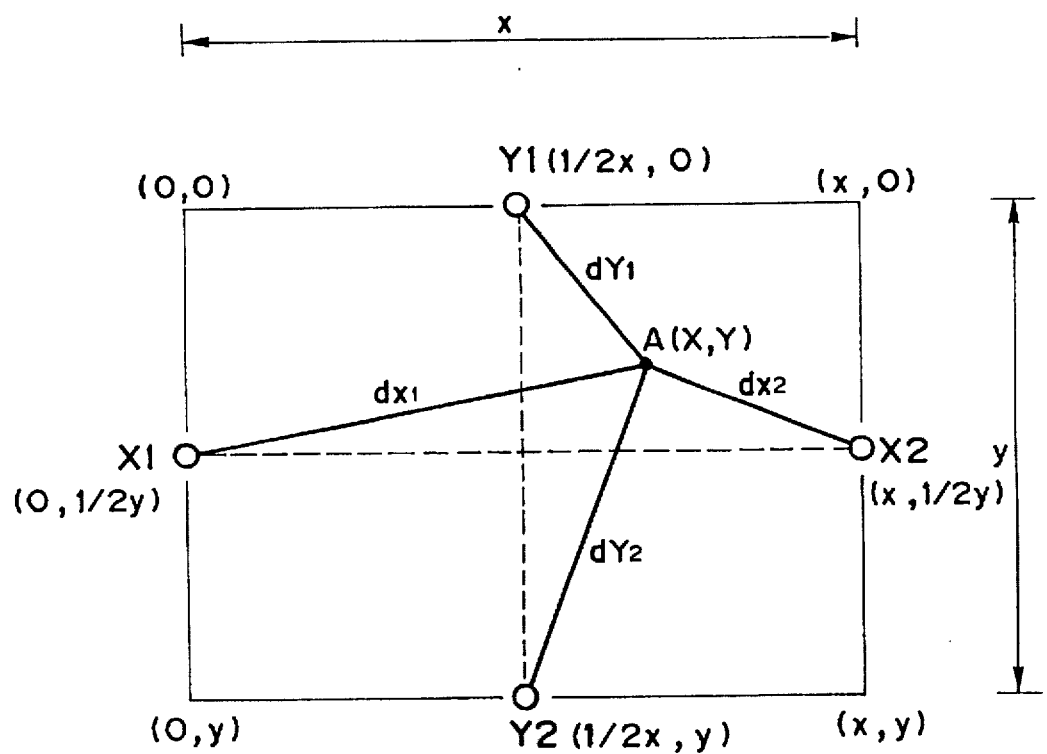
FIG. 4 is a view showing the coordinate system of a coordinate input apparatus according to the present invention.

FIG. 4 is a view showing the positions of sensors in the present embodiment. Two vibration sensors 6 oppositely positioned are made a pair, and two pairs of sensors X1.X2 and Y1.Y2 are arranged orthogonally to calculate coordinates. Now, where the vibrating input pen 3 indicates a point A at cooridnates (X, Y) to obtain its coordinate value, the real distance from the indicated point A to the Y1 vibration sensor 6 is given as dY1; to the Y2 vibration sensor 6, as dY2; to the X1 vibration sensor 6, as dX1; and, to the X2 sensor 6, as dX2. Also, the coordinate system is arranged as shown in FIG. 4, the coordinate value A (X, Y) is obtained in the procedures given below provided that the distance between the Y1 vibration sensor 6 and the Y2 vibration sensor 6 is defined as y, and the distance between the X1 vibration sensor 6 and the X2 vibration sensor 6, as x.

Figure 5:
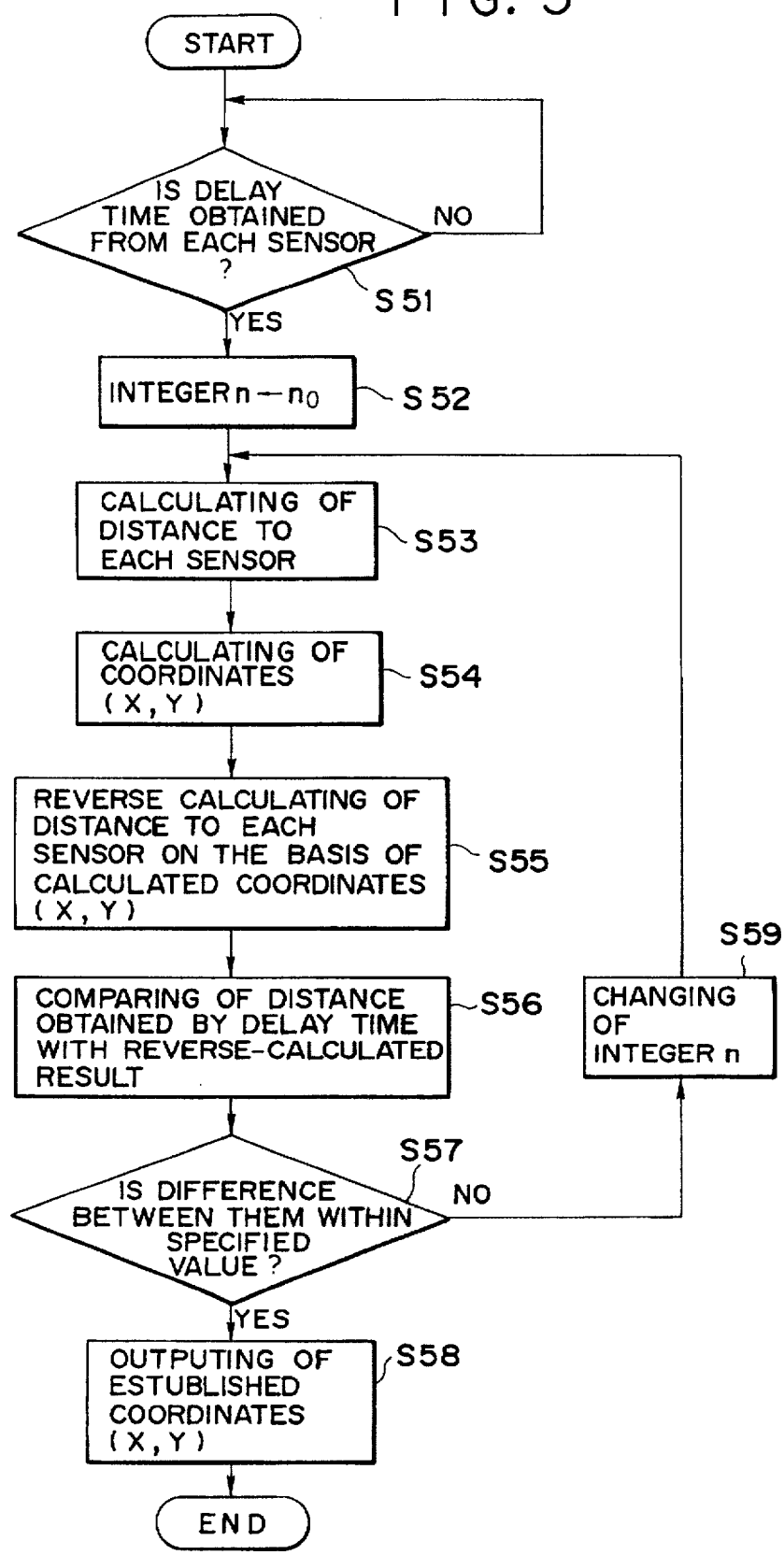
FIG. 5 is a flowchart showing the coordinate calculation processes according to the present invention.

FIG. 5 is a flowchart showing the flow of processes to calculate the coordinate value. In conjunction with FIG. 5, the processing procedures will be described.

At first, when the microcomputer 31 obtains the phase delay time by the latch circuits 17 to 20 from each of the four sensors 6 (S51-YES), this value and the known phase velocity are applied to the equation (4) to calculate the tentative distance from the vibration sensor 6 and the vibrating input pen 3. The second term of the equation (4) cannot be defined at this stage. Therefore, the tentative initial values $n_{o1}$ to $n_{o4}$ (represented by $n_o$) are obtained (S52) for each vibration sensors 6 in advance by a method which will be described later, and are substituted to the equation (4) (S53). Now, firstly, the distance LY1 from the point A to Y1 sensor is obtained according to the delay time $tp_1$ measured by Y1 sensor and the tentative initial value $n_{o1}$. Likewise, for Y2 sensor, the distance LY2 is calculated according to the delay time $tp_2$ and the initial value $n_{o2}$ of n. Then, these values LY1 and LY2 are applied to the equation (5) to calculate the Y coordinate. In the same way, the distances LX1 and LX2 from the point A to X1 sensor and X2 sensor are obtained, and using the equation (6), the X coordinate is calculated (S54).

$$Y=y/2+(LY1+LY2)(LY1-LY2)/2y \quad \ldots (5)$$

$$X=x/2+(LX1+LX2)(LX1-LX2)/2x \quad \ldots (6)$$

These values Y and X are values obtained from the two pairs of vibration sensors, a pair of Y1 and Y2, and a pair of X1 and X2, respectively, and are the values obtained independently. Therefore, when the distances to each of the vibration sensors 6, RLY1 and RLY2, and RLX1 and RLX2, are reversely calculated by the equations (7) to (10) described later, using the tentative coordinate value (X, Y) at the point A thus obtained here, they are not necessarily matched with the distances LY1 and LY2, and LX1 and LX2 calculated from the phase delay times and the initial values $n_o$ (because the second term of the equation (4) has not been defined as yet).

$$RLY1=sqrt((X-x/2)^2+Y^2) \quad \ldots (7)$$

$$RLY2=sqrt((X-x/2)^2+(Y-y)^2) \quad \ldots (8)$$

$$RLX1=sqrt(X^2+(Y-y/2)^2) \quad \ldots (9)$$

$$RLX2=sqrt((X-x)^2+(Y-y/2)^2) \quad \ldots (10)$$

RLY1: reversely calculated distance from point A to Y1 sensor

RLY2: reversely calculated distance from point A to Y2 sensor

RLX1: reversely calculated distance from point A to X1 sensor

RLX2: reversely calculated distance from point A to X2 sensor sqrt (S): S's positive square root Now, the reversely calculated distances from the point A to each of the sensors, RLY1, RLY2, RLX1 and RLX2, are obtained (S55) by the equations (7) to (10) and then the distances LY1, LY2, LX1, and LX2 obtained from the phase delay times and initial values $n_o$ (S53) and the values obtained in the step S55 are compared, respectively (S56). If each of them is found to be matched within the predetermined range of error (S57-YES), the coordinate input apparatus outputs the coordinates (X, Y) at that time as established coordinates or writes such value into its inner memory (S58). Also, if the values are not matched (S57-NO), integers are added to or subtracted from the initial values $n_o$ of n to set integers n again (S59) and the calculations (equations (4) to (10)) are again performed.

With the above-mentioned procedures, the aforesaid calculations are repeated while modifying the values of the integers n for each sensor until each of the values, RLY1, RLY2, RLX1, and RLX2, and each of the values, LY1, LY2, LX1, and LX2, becomes equal. Then, the distances LY1, Y2, LX1, and LX2 obtained from the phase delay times will become equal to the real distances dY1, dY2, dX1, and dX2.

In this way, it is possible to determine the coordinates at the point A. Now, the description will be made of a method of selecting the tentative values for the integers n in order to determine the second term of the equation (4).

Figure 6:
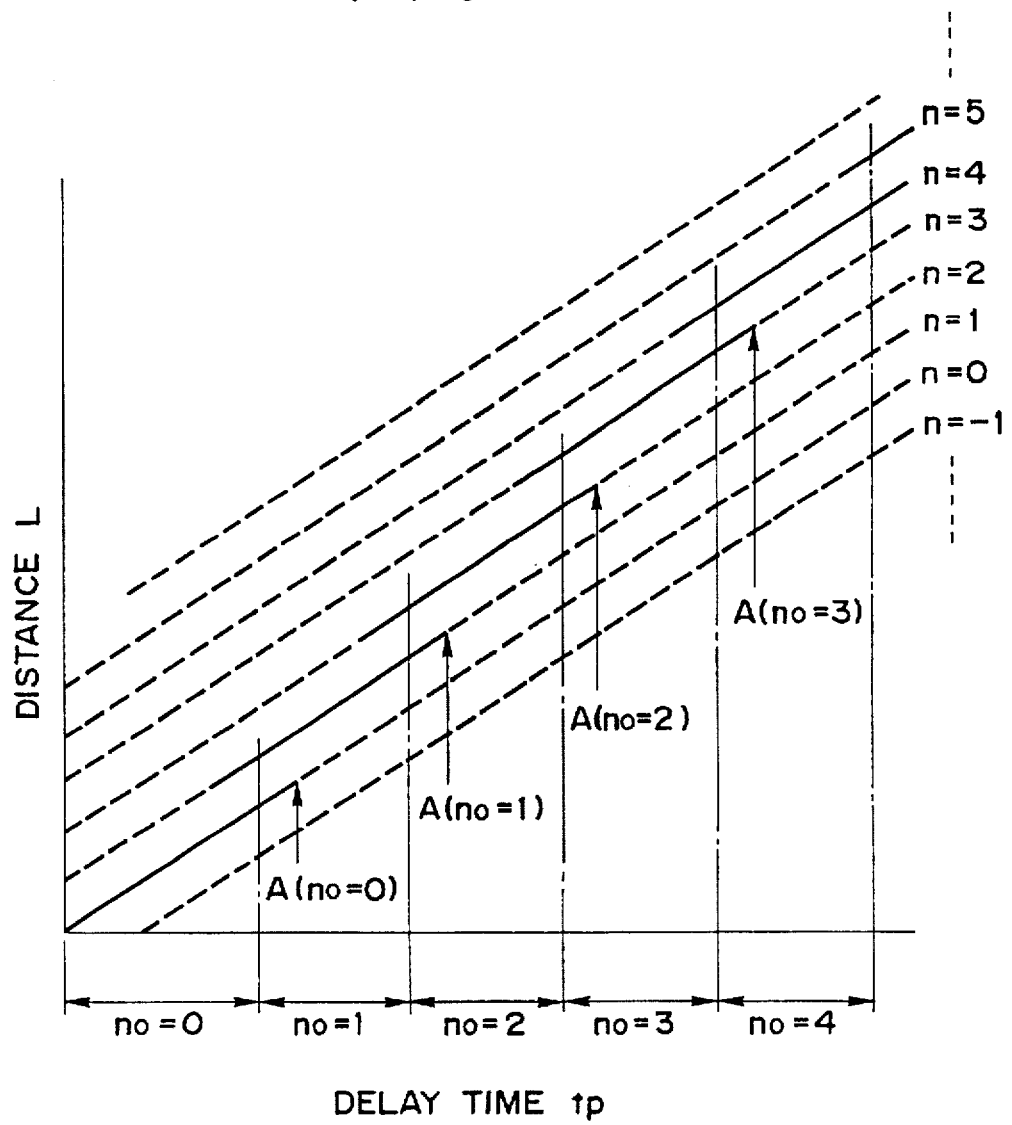
FIG. 6 is a graph showing relations between distances and detection delay times.

FIG. 6 is a view showing the relations between the delay times tp and distances L when a tool force is within a given range (solid lines in FIG. 6). If the tool force is weakened so that the levels of the detecting signal waveforms are significantly changed, the relationship represented by broken lines in FIG. 6 is also shown. Therefore, in an normal operation, there is a greater probability that the relationship is such as indicated by the solid lines. In the present embodiment, the initial values $n_o$ of integers n are given with the relations shown in FIG. 6 (the value of the initial value $n_o$ being made larger as the delay time becomes longer) on the basis of the detected delay times, hence implementing to shorten the calculation time. In the present embodiment, the initial value $n_o$ is defined in such manner. However, it may be possible to adopt a method for the definition of $n_o$ in which it is delimitated at each of the points A in FIG. 6, for example, as a matter of course.

Now, in the present embodiment, the description has been made of a Lamb wave. In a coordinate input apparatus using a pen for indicating coordinates, its tool force fluctuations cannot be avoided when it is in use. Thus, the level fluctuations of the detection signal waveforms cannot be avoided, either. Therefore, it is impossible to detect the definite point of a detection signal waveform (the leading portion of a detection signal, for example) without fail all the time. The present embodiment is applicable to a coordinate input apparatus using not only a Lamb wave, but also elastic wave such as surface wave or Lamb wave. Also, the Lamb wave described in the present embodiment are unique in that its phase velocity and group velocity is different and the phases in the detection signal waveforms are being deviated, but they can serve as an excellent coordinate calculating means without affect of the problem resulting from the levels of the detection signal waveforms or the peculiarity of the Lamb wave.

Thus, a coordinate input apparatus according to the present embodiment is not affected by the level fluctuations of the detection signal waveforms, that is, the attenuation of the elastic waves which are dependent on the distances from a vibrating input pen to each vibration sensor, the tool forces of the vibration pen at the time of coordinate input, or various other factors resulting in the level fluctuations, therefore, it is possible to calculate the coordinates accurately only in accordance with the phase information of the detection signal waveforms.

Moreover, according to the present structure, it is possible to use a Lamb wave having different group velocity and phase velocity as an elastic wave. Since the Lamb wave has slower phase velocity than an elastic wave such as a surface wave, its accuracy of distance detection can be enhanced if the resolution of the counter is the same for measuring the delay times. It is thus possible to obtain a resultant effect that the accuracy of the coordinates calculated by the coordinate input apparatus is also enhanced. Further, with a structure according to the present embodiment, it is possible to reduce the analogue circuits significantly because the coordinates are calculated only in accordance with the phase information available within the detection signal waveforms, hence leading to a lower power consumption and a lower cost in manufacturing and in operation. Also, as compared with the conventional apparatus which uses the envelope peaks of the detection signal waveforms as detection points, the detection points can be shifted closer to the leading portion of the detection signal waveforms in the present embodiment. As a result, the influence of the reflection waves from the end portion of the vibration transfer diaphragm becomes smaller, thus making it possible to reduce the size of the vibration transfer diaphragm itself significantly in relation to the effective area where the coordinate input can be conducted. There is an excellent advantage that the apparatus can be made compact.

In this respect, the present invention is applicable not only to a system comprising a plurality of equipment and devices, but also to an apparatus of single equipment and device. Further, it is unnecessary to mention that the present invention is applicable to a case where the requirements are met by providing a system or an apparatus with programs.

As described above, a coordinate input apparatus according to the present invention can calculate coordinates accurately only in accordance with the phase information of the detection signal waveforms without being affected by the level fluctuations of the detection signal waveform. Further, it is possible to save circuits, hence implementing a low power consumption and a low cost in manufacturing and operation as well as the make the apparatus compact.

What is claimed is:

1. A coordinate input apparatus comprising:
    vibration generating means for generating vibration;
    a vibration transferring member for transferring the vibration as a Lamb wave generated by said vibration generating means contacting the vibration transferring member;
    vibration detecting means arranged in said vibration transferring member for detecting the Lamb wave transferred to said vibration transferring means;
    measuring means for measuring an arrival time based only on phase velocity until the Lamb wave transferred to said vibration transferring member is detected by said vibration detecting means;
    storing means for storing the arrival time measured by said measuring means;
    distance deriving means for deriving a distance between said vibration generating means and said vibration detecting means on the basis of the arrival time measured by said measuring means and the phase velocity;
    distance calculating means for add/subtracting a wavelength of the Lamb wave multiplied by an integer n to/from the distance derived by said distance deriving means;
    position deriving means for deriving a coordinate position of said vibration generating means on the basis of the derived distance from said distance calculating means;
    distance reverse calculating means for deriving the distance between said vibration generating means and said vibration detecting means by operating reverse calculations on the basis of the derived coordinate position from said position deriving means;
    comparing means for comparing the distance derived from said distance calculating means with the distance derived from said distance reverse calculating means;
    modifying means for modifying the distance derived from said distance calculating means by changing said integer n on the basis of the comparative result of said comparing means and modifying the distance with the arrival time stored in said storing means if the comparison result by said comparing means is incorrect; and
    position re-deriving means for deriving the coordinate position of said vibration generating means again by said position deriving means on the basis of the modified distance by said modifying means.

2. A coordinate input apparatus according to claim 1, wherein
    said vibration detecting means comprises a piezoelectric element.

3. A coordinate input apparatus according to claim 1, wherein said vibration detecting means detects Lamb waves transferred by said vibration transferring member, and said distance deriving means derives the distance between said vibration generating means and said vibration detection means on the basis of phase velocity of the detected signal of the Lamb wave.

4. A coordinate input apparatus according to claim 1, wherein said distance reverse calculating means derives the distance between the two points by mathematically operative technique in accordance with the coordinate position derived from said position deriving means and the coordinate position of said vibration detecting means.

5. A coordinate input apparatus comprising:
    vibration generating means for generating vibration;
    a vibration transferring member for transferring the vibration as a Lamb wave generated by said vibration generating means contacting the vibration transferring member;
    a plurality of vibration detecting means arranged in said vibration transferring member for detecting the Lamb wave transferred to said vibration transferring means;
    measuring means for measuring an arrival time based only on phase velocity until the Lamb wave transferred to said vibration transferring member is detected by each of said plurality of vibration detecting means;
    a plurality of storing means for storing each arrival time to each vibration detecting means measured by said measuring means;
    distance deriving means for deriving distances between said vibration generating means and each of said plurality of detecting means on the basis of the arrival times stored in said plurality of storing means and the phase velocity;
    distance calculating means for adding/subtracting a wavelength of the Lamb wave multiplied by an integer n to/from the distance derived by said distance deriving means;
    position deriving means for deriving coordinate positions of said vibrating generating means on the basis of the derived distance from said distance calculating means;

distance reverse calculating means for deriving the distances between said vibration generating means and each of said plurality of vibration detecting means by operating reverse calculations on the basis of the derived coordinate positions from said position deriving means;

comparing means for comparing the distance derived from said distance calculating means with the distance derived from said distance reverse calculating means;

modifying means for modifying the distance derived from said distance calculating means by changing said integer n on the basis of the comparative result of said comparing means and modifying the distance with the arrival time stored in said storing means if the comparison result by said comparing means is incorrect; and position re-deriving means for deriving the coordinate positions of said vibration generating means again by said position deriving means on the basis of the modified distance by said modifying means.

6. A coordinate input apparatus according to claim 5, wherein said vibration detecting means comprises a piezoelectric element.

7. A coordinate input apparatus according to claim 5, wherein said plurality of vibration detecting means detect signals of a Lamb wave transferred by said vibrating transferring member, and said distance detecting means derives the distances between said vibration generating means and said plurality of vibration detecting means in accordance with phase velocity of said detected Lamb wave signals.

8. A method for modifying coordinates for collection, comprising:

step 1 of storing an arrival delay time based on a phase velocity at which a Lamb wave inputted into a vibration transferring plate arrives at a vibration sensor;

step 2 of deriving a distance L between a point of the vibration input and the vibration sensor on the basis of the arrival delay time based on the phase velocity of the Lamb wave stored in the step 1 by substituting a value n in an arithmetic expression given below:

$$L = V_p \cdot tp + n \cdot \lambda p$$

where $V_p$: phase velocity of the Lamb wave tp: arrival delay time of the Lamb wave $\lambda p$: wavelength of Lamb wave n: integer and L is a positive real number;

step 3 of deriving a coordinate at the input point of vibration in accordance with the distance derived from the step 2;

step 4 of reversely calculating the distance to the vibratory sensor in accordance with the coordinates derived from the step 3;

step 5 of determining whether a difference between the distance obtained in the step 2 and the distance obtained in the step 4 is within a range of a predetermined value or not;

step 6 of outputting the point of coordinates derived from the step 3 specifically if the difference in distances is determined to be within the range of the predetermined value in the step 5; and step 7 of modifying the value n assigned in the step 2 to derive the distance if the difference in the distances is found to be out of the range of the predetermined value in the step 5.

* * * * *

UNITED STATES PATENT AND TRADEMARK OFFICE
CERTIFICATE OF CORRECTION

PATENT NO. : 5,736,979
DATED : April 7, 1998
INVENTOR(S) : KATSUYUKI KOBAYASHI ET AL.     Page 1 of 3

It is certified that error appears in the above-identified patent and that said Letters Patent is hereby corrected as shown below:

AT [57] ABSTRACT

Line 7, "coordinate" should read --coordinates--.

IN THE DRAWINGS

Figure 8:
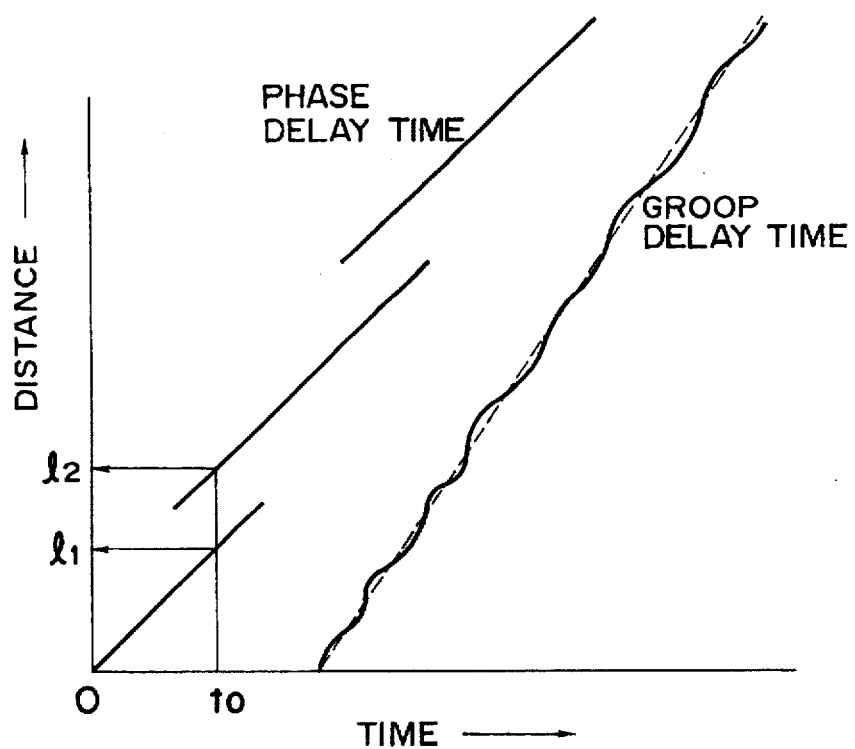
FIG. 8 is graph showing relationship between the phase delay time and group delay time of a Lamb wave, and distances.

Sheet 8, FIG. 8, "GROOP" should read --GROUP--.

COLUMN 1

Line 32, "sheet" should read --sheets--; and
    Line 59, "wave" should read --waves--.

COLUMN 2

Line 37, "cost up." should read --rise in cost.--;
    Line 39, "lagged" should read --lagging--;
    Line 41, "as" should read --to be--; and
    Line 65, "of" should read --of an--.

COLUMN 3

Line 11, "the" (second occurrence) should be deleted and "wave" should read --wave,--;
    Line 23, "$l_1$ or $l_2$" should read --$l_1$ or $l_2$--; and
    Line 58, "coordinate" should read --coordinates--.

UNITED STATES PATENT AND TRADEMARK OFFICE
CERTIFICATE OF CORRECTION

PATENT NO. : 5,736,979
DATED : April 7, 1998
INVENTOR(S) : KATSUYUKI KOBAYASHI ET AL.

It is certified that error appears in the above-identified patent and that said Letters Patent is hereby corrected as shown below:

COLUMN 4

Line 9, "end" should read --the end--.

COLUMN 5

Line 27, "with" should read --with a--.

COLUMN 6

Line 5, "on" should read --in--;
Line 28, "having" should read --has--;
Line 49, "by" should read --by the--; and
Line 63, "if" should read --it--.

COLUMN 7

Line 2, "cooridnates" should read --coordinates--; and
Line 23, "each" should read --each of the--.

COLUMN 8

Line 41, "delimitated" should read --delimited--;
Line 53, "Lamb" (first occurrence) should read --Love--;
Line 54, "are" should read --is--; and
Line 55, "is" should read --are--.

UNITED STATES PATENT AND TRADEMARK OFFICE
CERTIFICATE OF CORRECTION

PATENT NO. : 5,736,979
DATED : April 7, 1998
INVENTOR(S) : KATSUYUKI KOBAYASHI ET AL.

It is certified that error appears in the above-identified patent and that said Letters Patent is hereby corrected as shown below:

COLUMN 9

Line 42, "the make" should read --making--.

Signed and Sealed this

Twenty-third Day of February, 1999

Attest:

Q. TODD DICKINSON

Attesting Officer

Acting Commissioner of Patents and Trademarks